(12) United States Patent
Gregoire

(10) Patent No.: US 11,995,423 B2
(45) Date of Patent: May 28, 2024

(54) SYSTEM ON CHIP (SOC) COMPRISING A PROGRAM INSTALLATION SOFTWARE FOR UPDATING A PROGRAM

(71) Applicant: STMicroelectronics (Grand Ouest) SAS, Le Mans (FR)

(72) Inventor: Fabien Gregoire, Thorigne-Fouillard (FR)

(73) Assignee: STMicroelectronics (Grand Ouest) SAS, Le Mans (FR)

( * ) Notice: Subject to any disclaimer, the term of this patent is extended or adjusted under 35 U.S.C. 154(b) by 141 days.

(21) Appl. No.: 17/868,456

(22) Filed: Jul. 19, 2022

(65) Prior Publication Data
US 2023/0022755 A1    Jan. 26, 2023

(30) Foreign Application Priority Data

Jul. 26, 2021  (FR) ...................... 2108107

(51) Int. Cl.
*G06F 8/61*    (2018.01)
*G06F 21/44*   (2013.01)

(52) U.S. Cl.
CPC ............... *G06F 8/61* (2013.01); *G06F 21/44* (2013.01)

(58) Field of Classification Search
None
See application file for complete search history.

(56) References Cited

U.S. PATENT DOCUMENTS

| 6,151,657 A | * | 11/2000 | Sun .................... G06F 8/654 |
| | | | 726/19 |
| 2017/0090909 A1 | * | 3/2017 | Guo .................... G06F 8/66 |
| 2018/0095740 A1 | * | 4/2018 | Kotary ............... G06F 9/4401 |
| 2019/0042230 A1 | * | 2/2019 | Dewan ............... G06F 21/57 |
| 2021/0303691 A1 | * | 9/2021 | Dewan ............. G06F 21/572 |

FOREIGN PATENT DOCUMENTS

CN    107402776 A    11/2017

OTHER PUBLICATIONS

Hua J et al: "Bluetooth Wireless Monitoring, Diagnosis and Calibration Interface for Control System of Fuel Cell Bus in Olympic Demonstration", Journal of Power Sources, Elsevier, Amsterdam, NL, vol. 186, No. 2, pp. 478-484.
Qingqing Xu: "A Design and Implement of IAP Based on HTTP", IEEE 2011 International Conference on Computer Science and Service System (CSSS), pp. 1918-1922, DOI: 10.1109/CSSS.2011.5974104 ISBN: 978-1-4244-9762-1.

* cited by examiner

*Primary Examiner* — Qing Chen
(74) *Attorney, Agent, or Firm* — Crowe & Dunlevy LLC

(57) ABSTRACT

A system on chip includes a non-volatile memory and a processor configured to execute an operating system which receives data according to a first communication protocol and program installation software that communicates with the non-volatile memory according to a second communication protocol. The operating system functions to: determine whether data received according to the first communication protocol is program data, make the program data available to the installation software, and inform the installation software that program data has been received. The installation software then stores the program data in the non-volatile memory.

12 Claims, 2 Drawing Sheets

SYSTEM ON CHIP (SOC) COMPRISING A PROGRAM INSTALLATION SOFTWARE FOR UPDATING A PROGRAM

PRIORITY CLAIM

This application claims the priority benefit of French Application for Patent No. 2108107, filed on Jul. 26, 2021, the content of which is hereby incorporated by reference in its entirety to the maximum extent allowable by law.

TECHNICAL FIELD

Embodiments and implementations relate to the systems on chip and, more particularly, to updating programs installed on a system on chip.

BACKGROUND

A system on chip (SoC) generally integrates program installation software. This installation software is stored in a non-volatile memory on the system on chip during its manufacture. For example, the installation software may be comprised in a "firmware" installed on the system on chip. This installation software is used to install the programs of a user. Once the user programs are installed, the installation software can also be used to update the installed programs. For example, the installation software can be configured to store different versions of a program in a non-volatile memory. A communication protocol between the installation software and the non-volatile memory is defined by the manufacturer of the system on chip.

A user of the system on chip can in turn configure the system on chip according to communication protocols which can be different from that provided for the installation software.

Once the user programs are installed on the system on chip, the installation software provided during the manufacture may not be usable because: the installation software operates using the communication protocol(s) defined by the manufacturer, and/or the installation software uses a hardware interface appropriate to its production environment which is not necessarily that selected by the user.

In addition, it is necessary to change the configuration of the system on chip (that is to say exit the user configuration) in order to be able to use the manufacturer's installation software. However, changing the configuration has the drawback of blocking the execution of the users' programs and requiring a reboot of the system on chip.

The user therefore generally provides their own installation software to update their programs. The user's installation software is then configured to operate with the user-defined communication protocols when updating their programs. In this manner, the user does not have to change the configuration of the system on chip to update their programs.

Nevertheless, such a solution has the drawback of requiring an additional memory space to store the user-developed installation software, in addition to the memory space occupied by the installation software initially integrated into the system on chip. Such a solution is therefore expensive.

There is a need in art for a solution simplifies the update of the programs installed on a system on chip.

SUMMARY

According to one aspect, a system on chip is proposed comprising: a non-volatile memory; a processor configured to execute: an operating system configured to receive data according to a first communication protocol, and a program installation software configured to communicate with the non-volatile memory according to a second communication protocol in order to be able to store data of a program in this non-volatile memory; in which the operating system is also configured to: determine whether data received according to said first communication protocol is program data intended for the installation software, make available to the installation software the program data which is received and intended for said installation software, and inform the installation software that program data which is intended therefor has been received; and in which the installation software is configured to store the program data made available thereto in said non-volatile memory according to the second communication protocol.

Thus, the program data is received by the operating system according to the first communication protocol, then made available to the installation software so that it stores said data in the non-volatile memory according to its own communication protocol. The system on chip therefore allows use of the installation software without having to change the configuration of the system on chip.

In this manner, the installation software which is installed on the system on chip by the manufacturer can be used simply to perform updates of the installed programs. It is therefore no longer necessary for the user to develop their own installation software. A single installation software is thus installed in the non-volatile memory of the system on chip.

Furthermore, the operating system may continue to run a program while the installation software performs its update.

In an advantageous embodiment, the data is encapsulated in a frame having a format defined according to the first communication protocol.

Preferably, the frame comprises a header followed by said encapsulated data and ends with a trailer, the header being configured to indicate whether the data is intended for the installation software.

Advantageously, the installation software is configured to verify an authenticity of the data made available by the operating system.

In an advantageous embodiment, the program data received by the operating system is encrypted. The installation software is then configured to decrypt the data before storing it in the non-volatile memory.

Preferably, the system on chip comprises a volatile memory. The operating system is then configured to make the program data available to the installation software in the volatile memory.

According to another aspect, a method for installing a program is proposed comprising: transmitting program data to a system on chip as previously described, according to the first communication protocol; receiving, by the operating system of the system on chip, of the program data; verifying by the operating system that the received data is indeed program data intended for the installation software; making the program data for the installation software available by the operating system; indicating by the operating system to the installation software that program data has been received; and storing the program data by the installation software in the non-volatile memory according to the second communication protocol.

In an advantageous embodiment, the data received by the operating system is encapsulated in a frame having a format defined according to the first communication protocol. Preferably, the frame comprises a header followed by said encapsulated data and ends with a trailer, the header being configured to indicate whether the data is intended for the installation software.

Advantageously, the method further comprises verifying by the installation software of an authenticity of the data made available by the operating system.

In an advantageous embodiment, the program data received by the operating system is encrypted, the method further comprising decrypting by the installation software of the data made available by the operating system before storing it in the non-volatile memory.

In an advantageous embodiment, the program data is made available to the installation software by the operating system in a volatile memory.

BRIEF DESCRIPTION OF THE DRAWINGS

Other advantages and features will become apparent on examining the detailed description of implementations and embodiments, without limitation, and of the appended drawings in which.

DETAILED DESCRIPTION

Figure 1:
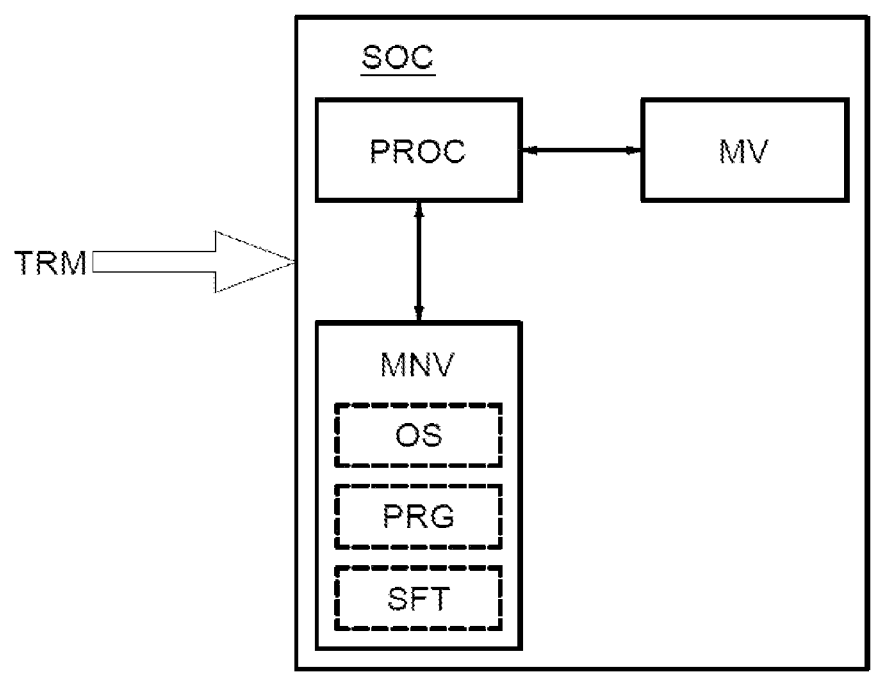
FIG. 1 illustrates a system on chip.

FIG. 1 illustrates a system on chip SOC according to one embodiment. The system on chip SOC comprises a processor PROC, a non-volatile memory MNV, and a volatile memory MV.

An operating system OS and an installation software SFT are stored in the non-volatile memory MNV. The installation software SFT is defined by a manufacturer of the system on chip SOC and the operating system OS is defined by a user of the system on chip SOC.

A portion of the non-volatile memory MNV may be reserved for the manufacturer of the system on chip. This portion of the non-volatile memory then allows storing the installation software SFT. Another portion of the non-volatile memory MNV can be reserved for the user of the system on chip. This portion can then be used to store the user's operating system. This same portion of the non-volatile memory MNV can also be used to store user programs PRG.

The operating system OS is configured to receive data according to a first user-defined communication protocol.

Figure 2:
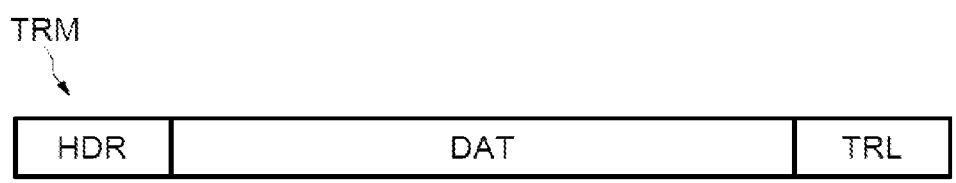
FIG. 2 illustrates an example of a data transmission frame.

In particular, the data is transmitted to the operating system OS in frames. These frames have a user-defined format. An example of a frame TRM is illustrated in FIG. 2. Each frame TRM starts with a header HDR followed by data DAT and ends with a trailer TRL. The data DAT can be of different types. The operating system is configured to process certain types of data. Thus, the header HDR comprises information relating to the data DAT of the frame TRM, in particular the type of the data of the frame. The trailer TRL allows for signaling the end of a frame TRM. The data DAT of the frame can be encrypted.

Furthermore, certain types of data DAT may be intended for the installation software SFT. The data DAT intended for the installation software can be program data. This program data can be intended for the installation software SFT for an update of a program installed on the system on chip. The program data then corresponds to a new version of a program stored in the non-volatile memory of the system on chip.

The data DAT for the installation software SFT is transmitted to the operating system OS in the same format as the data that can be processed by the operating system OS. The data intended for the installation software SFT is therefore encapsulated in a format that can be read by the operating system OS. The header HDR of a frame TRM can then allow indicating to the operating system OS that this frame TRM is intended for the installation software SFT.

In particular, the operating system OS is configured to read the header HDR of each received TRM frame in order to determine whether the received frame TRM is intended for the installation software SFT from the header HDR thereof.

When the operating system OS identifies that a frame is intended for the installation software SFT, the operating system OS is configured to extract the data DAT from the frame TRM and then store it in the volatile memory MV.

Once the data is stored in the volatile memory MV, the operating system OS is configured to call the installation software SFT so that the latter processes said data DAT which is intended therefor.

In particular, the installation software SFT is configured to first verify a data authenticity. This authentication is made possible by the presence of a secret data item stored in the non-volatile memory MNV and known to the user.

Once the authenticity of the data is verified, the installation software SFT is configured to decrypt the data DAT. Then, after decrypting the data DAT, the installation software is configured to store the data in the non-volatile memory MNV according to its own communication protocol in order to perform the program update.

Figure 3:
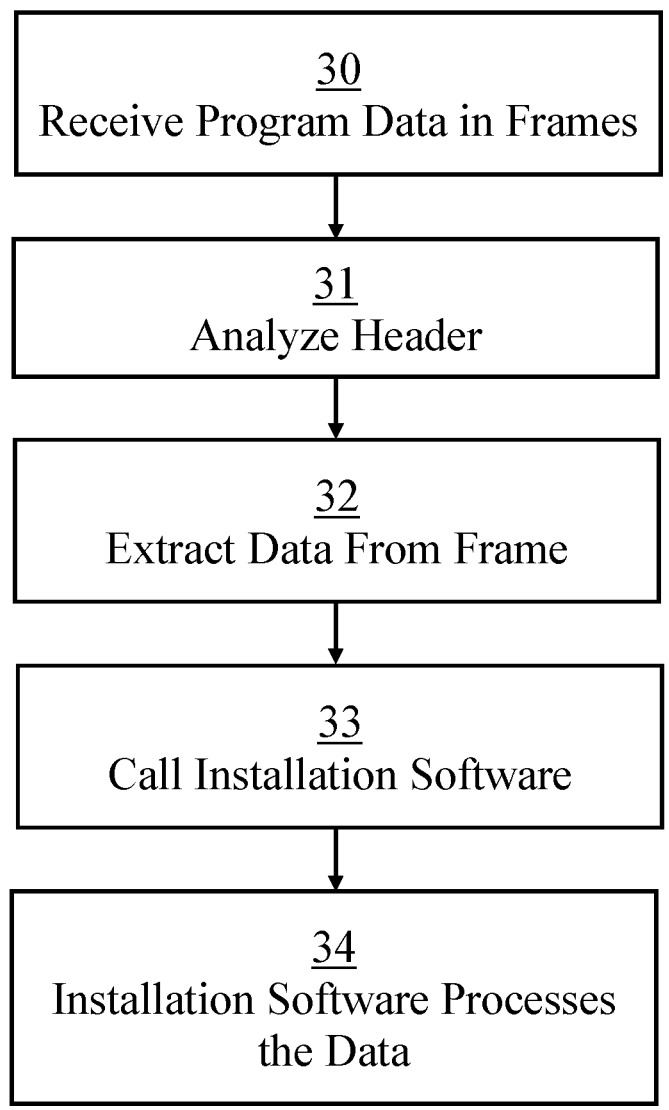
FIG. 3 illustrates an embodiment of a method for updating a program installed on a system on chip.

FIG. 3 illustrates an embodiment of a method for updating a program PRG installed on a system on chip, such as that described above.

The method comprises a step 30 in which the system on chip SOC receives program data in frames. This data can be encrypted. This data corresponds to a new version of the program installed on the system on chip.

These frames are then read successively by the operating system OS installed on the system on chip.

In particular, for each received frame, the method comprises a step 31 in which the operating system OS analyzes the header HDR of the frame TRM. The analysis of the header HDR of the frame TRM allows the operating system OS to determine whether the data DAT in the frame TRM is intended for the installation software SFT.

If the operating system OS determines that the data DAT of a frame TRM is intended for the installation software SFT, the method comprises a step 32 in which the operating system extracts the data DAT from the frame TRM and stores it in the volatile memory MV.

In the latter case, the method also comprises a step 33 in which the operating system OS calls the installation software SFT in order to indicate to the latter that the data DAT intended therefor is available in the volatile memory MV.

Then, the method comprises a step 34 in which the installation software SFT processes the data which is intended therefor in the volatile memory MV. In particular, the installation software SFT verifies the authenticity of the data present in the volatile memory MV. If the installation software SFT considers the data to be authentic, the software then decrypts the data before storing it in the non-volatile memory MNV according to its own communication protocol. The installation software SFT will finally verify the integrity of the update (thanks to the verification of a signature provided by the user via the data DAT as well). Saving the data DAT of the new version of the program in the non-volatile memory MNV allows updating the program installed on the system on chip SOC.

The system on chip SOC allows using the installation software without having to change the configuration of the system on chip to install or update a program. Indeed, the program data is encapsulated according to the first communication protocol defined for the operating system, then made available to the installation software to store it in non-volatile memory according to its own communication protocol.

In this manner, the installation software which is installed on the system on chip by the manufacturer can be used simply to perform updates of the installed programs. It is therefore no longer necessary for the user to develop their own installation software. A single installation software is thus installed in the non-volatile memory of the system on chip. Furthermore, the operating system maintaining control over the management of the reception of the frames intended for the installation software, this allows it to establish an order of priority for its tasks so as to be able to execute a program during the update if necessary.

The invention claimed is:

1. A system on chip, comprising:
    a non-volatile memory; and
    a processor configured to execute:
        an operating system configured to receive program data according to a first communication protocol; and
        a program installation software configured to communicate with the non-volatile memory according to a second communication protocol in order to store program data of a program installed in the non-volatile memory;
    wherein the operating system when executed by the processor is further configured to:
        determine whether the program data received according to the first communication protocol is program data intended for the program installation software;
        make the program data available to the program installation software; and
        inform the program installation software that the program data has been received; and
    wherein the program installation software when executed by the processor is further configured to store the program data in the non-volatile memory according to the second communication protocol to allow updating of the program installed in the non-volatile memory.

2. The system on chip according to claim 1, wherein the program data received according to the first communication protocol by the operating system is encapsulated in a frame having a format defined according to the first communication protocol.

3. The system on chip according to claim 2, wherein the frame comprises a header followed by the encapsulated program data and ends with a trailer, and wherein the header is configured to indicate whether the program data received according to the first communication protocol by the operating system is the program data intended for the program installation software.

4. The system on chip according to claim 1, wherein the program installation software is further configured to verify an authenticity of the program data made available by the operating system.

5. The system on chip according to claim 1, wherein the program data received according to the first communication protocol by the operating system is encrypted, and wherein the program installation software is further configured to decrypt the encrypted program data before storing the decrypted program data in the non-volatile memory according to the second communication protocol to allow updating of the program installed in the non-volatile memory.

6. The system on chip according to claim 1, further comprising a volatile memory, and wherein the operating system is further configured to make the program data available to the program installation software in the volatile memory.

7. A method for updating a program installed on a system on chip, comprising:
    transmitting program data to the system on chip according to a first communication protocol;
    receiving, by an operating system of the system on chip, the program data according to the first communication protocol;
    communicating, by a program installation software of the system on chip, with a non-volatile memory of the system on chip according to a second communication protocol in order to store program data of the program installed on the system on chip;
    verifying, by the operating system of the system on chip, that the program data received according to the first communication protocol is program data intended for the program installation software of the system on chip;
    making, by the operating system of the system on chip, the program data available to the program installation software of the system on chip;
    indicating, by the operating system of the system on chip, to the program installation software of the system on chip that the program data has been received; and
    storing, by the program installation software of the system on chip, the program data in the non-volatile memory of the system on chip according to the second communication protocol to allow updating of the program installed on the system on chip.

8. The method according to claim 7, wherein the program data received according to the first communication protocol by the operating system of the system on chip is encapsulated in a frame having a format defined according to the first communication protocol.

9. The method according to claim 8, wherein the frame comprises a header followed by the encapsulated program data and ends with a trailer, and wherein the header is configured to indicate whether the program data received according to the first communication protocol by the operating system of the system on chip is the program data intended for the program installation software of the system on chip.

10. The method according to claim 7, further comprising verifying, by the program installation software of the system on chip, an authenticity of the program data made available by the operating system of the system on chip.

11. The method according to claim 7, wherein the program data received according to the first communication protocol by the operating system of the system on chip is encrypted, and further comprising decrypting, by the program installation software of the system on chip, the encrypted program data before storing the decrypted program data in the non-volatile memory of the system on chip according to the second communication protocol to allow updating of the program installed on the system on chip.

12. The method according to claim 7, wherein the program data is made available to the program installation software of the system on chip by the operating system of the system on chip in a volatile memory.

* * * * *